United States Patent [19]
Guderjahn

[11] 3,892,185
[45] July 1, 1975

[54] LOW DRAG MAGNETIC SUSPENSION SYSTEM

[75] Inventor: Charles A. Guderjahn, Northridge, Calif.

[73] Assignee: Rockwell International Corporation, El Segundo, Calif.

[22] Filed: Apr. 24, 1972

[21] Appl. No.: 247,195

Related U.S. Application Data

[62] Division of Ser. No. 97,232, Dec. 11, 1970, Pat. No. 3,717,103.

[52] U.S. Cl...... 104/148 LM; 191/22 DM; 238/150
[51] Int. Cl............................................. B61d 13/08
[58] Field of Search .... 191/22 DM, 29 DM, 33 DM, 191/22 SS; 104/148 LM, 23 FS, 148 LM; 238/150

[56] References Cited
UNITED STATES PATENTS

| | | |
|---|---|---|
| 432,204 | 7/1890 | McLaughlin.................... 104/140 |
| 3,589,300 | 6/1971 | Wipf................. 104/148 |
| 3,616,763 | 11/1971 | Collins.................. 104/148 LM |
| R26,189 | 4/1967 | Dehn............................ 191/22 DM |

Primary Examiner—Robert G. Sheridan
Assistant Examiner—Richard A. Bertsch
Attorney, Agent, or Firm—L. Lee Humphries; Henry Kolin

[57] ABSTRACT

An improved magnetic suspension system including an improved guide-way channel for moving bodies including vehicles of eddy current repulsion between said magnets and said guideway channel containing nonferromagnetic conductors and attraction to a ferromagnetic member. This combination suspension system provides effective lift at low speeds and greatly improved lift/drag ratios.

5 Claims, 10 Drawing Figures

LOW DRAG MAGNETIC SUSPENSION SYSTEM

The invention described herein was made in the course of, or under, a contract with the U.S. Atomic Energy Comission.

This is a division of application Ser. No. 97,232, filed Dec. 11, 1970, now U.S. Pat. No. 3,717,103.

BACKGROUND OF THE INVENTION

1. Field of the Invention

This invention relates to the field of magnetic suspension systems. More particularly, it is related to improvements in eddy current repulsion suspension systems including guide-way channels and their use with vehicles such as trains and rocket sleds. Still further, this invention is related to improved suspension systems and guide-way channels which combines eddy current repulsion and ferromagnetic attraction to provide a lift force.

2. Description of the Prior Art

Vehicles such as passenger trains which travel along the ground on rails are limited in speed below about 150 miles per hour by the requirement for a smooth track since higher speeds promote rapid degradation of the rails. Although some improvements in design of conventional vehicles are possible, if speeds substantially greater than 250 miles per hr. are desired, an alternative suspension system must be used. Ground effect and air suspension systems have been considered but suffer from control and excessive power use problems.

Various forms of magnetic suspension systems have been suggested in the art. An early suggestion by Gracmiger to use electromagnets which is attracted to an overload rail but kept at a constant distance away from the rail by a servo-system which controls magnetic current has been noted (R. G. Polgren, *New Applications of Modern Magnets*, McDonald & Co., London (1966). A similar system is described by Silverman in U.S. Pat. No. 3,125,964. Another early proposal was made by Bachelet in U.S. Pat. No. 2,020,943. That patent describes a train suspension system operating by eddy current repulsion. The eddy currents are induced in sheets of nearly conductor which serve as rails by an alternating current magnet which is mounted on the train. This scheme is very interesting but unfortunately impractical due to the magnitude of resistance losses in the magnet. More recently, Powell, Jr., et al, U.S. Pat. No. 3,470,828 have proposed a train carrying a superconductor magnet and supported over short loops of closed circuited conductors which correspond to rails of an ordinary train. Currents are induced in the ground loops in such a direction as to oppose and lift a superconducting magnet. The loop currents are induced, in small sections at a time, by the current loops on the moving vehicle. This eliminates the need for external track current power supply; track currents flow only when necessary, and the energy in a given track loop is largely retrieved as the train passes across the stationary track loop. The loops proposed are not continuous and involve a substantial expense in forming the track bed. Another recent proposal by Guderjahn et al, "Magnetic Suspension and Guidance for High Speed Rockets by Superconducting Magnets," J. Appl. Physics, Vol. 40, page 2133, (1969), involves the replacement of the discrete loops of Powell, Jr., et al with a continuous U-shaped conductor such as copper or aluminum. Although the use of continuous conductor improves the practicality of a superconducting eddy current repulsion suspension system, certain problems remain. One problem is that the induced eddy currents produce a drag on the magnet as well as a levitation force. The lift-to-drag ratio is dependent on the shape of the channels. Making a suspension system very stiff results in high drag since the levitation forces oppose and cancel at the channel center but the drag forces are additive. As a consequence, there is a need in the art for a system which has a low drag-to-lift ratio and at the same time has adequate stiffness. Another problem is the complete absence of lift at zero velocity with conventional eddy current repulsion system and the absence of sufficient lift at low speeds. One way to solve this problem is through the use of an alternating current magnet, however, the use of alternating current magnets is generally considered impractical due to resistive losses in the magnets. Thus, there also remains a need in the art for an improved suspension system for high speed ground vehicles which has adequate lift at low speeds.

SUMMARY OF THE INVENTION

I have now discovered a new and improved magnetic suspension system for moving bodies including ground vehicles which has an improved lift-to-drag ratio and adequate lift at low speeds. In the improved suspension system, a magnet attached on a vehicle is suspended within a stationary guide-way channel formed of a combination of nonferromagnetic material and ferromagnetic material. An inner strip of ferromagnetic material is added to the upper portion of the channel thereby providing an improved channel structure which results in lower drag and greater lift forces. In one embodiment, the ferromagnetic portion is designed such that it becomes saturated when the vehicle magnet comes to within a predetermined distance. This prevents the ferromagnetic material from subjecting the magnet to ever increasing attractive forces as it approaches the ferromagnetic material and allows flux to enter a back-up layer of nonferromagnetic material thereby providing stable lifting force.

DETAILED DESCRIPTION OF THE PREFERRED EMBODIMENTS

The present invention provides an improved form of suspension system and guide-way for use with moving bodies including land vehicles. This new suspension system has greatly improved lift-to-drag characteristics as will be disclosed hereinafter.

The invention is based upon a unique arrangement which synergistically combines the attractive force between a magnet and a ferromagnetic material with the repulsive force between a moving magnet and a nonferromagnetic conductor to achieve an improved suspension system for moving bodies having magnets attached thereto.

Figure 1:
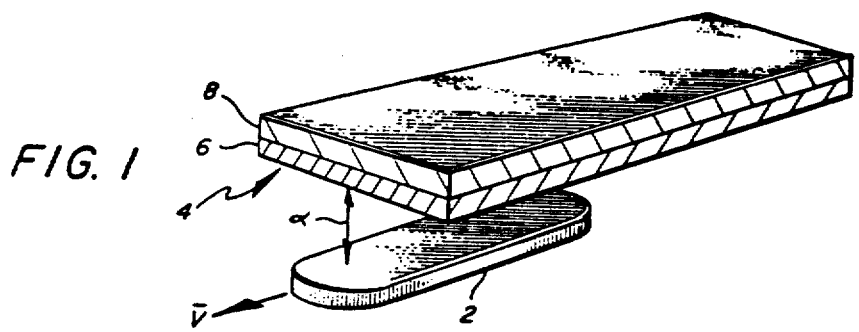
FIG. 1 is a perspective view partially cut-away showing a guide-way channel and a traveling magnet in cooperative relation therewith according to the present invention.

The basic principle of the invention may be understood by making reference to attached FIG. 1. In that figure, 2 represents a magnet moving at a velocity $\bar{V}$ in the direction indicated by the arrow. A composite guide-way surface 4 is positioned at a distance $\alpha$ above magnet 2. This composite consists of a second layer 6 of ferromagnetic material; for example, iron, together with a first layer 8 of nonferromagnetic conductor material; for example, aluminum. Magnet 2 is attracted to ferromagnetic material 6 with the force of attraction inversely related to the distance between layer 6 and magnet 2. As distance $\alpha$ decreases, a point will be reached where layer 6 becomes saturated with flux from magnet 2. The magnitude of the attractive force between layer 6 and magnet 2 remains substantially constant at distances $\alpha$ less than the saturation distance. In addition, once layer 6 becomes saturated, flux begins to enter layer 8. This causes the formation of eddy currents in conductor 8 which in turn create a repulsive force between the conductor and the magnet. This repulsion force is a function of the distance $\alpha$ and velocity $\bar{V}$ of the magnet. The net force between magnet 2 and surface 4 for varying distances $\alpha$ at a constant magnet velocity are illustrated in FIGS. 2, 3 and 4 by arrows attached to the magnet.

Figure 2:
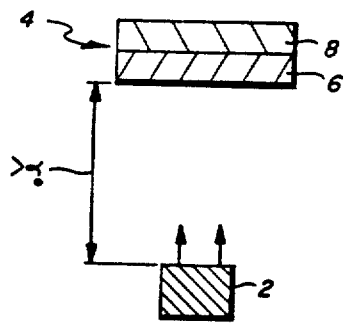
FIG. 2 is a schematic illustration in cross-section illustrating the establishment of attractive forces between a guide-way surface and a moving magnet positioned at a distance $>a_o$ beneath the guide-way surface.

FIG. 2 illustrates the net attractive force which is present when magnet 2 is at a distance greater than $\alpha_o$ beneath composite guide-way surface 4. In this case, the distance (greater than $\alpha_o$) is such that either layer 6 is not saturated and no flux is entering layer 8 and the net force created is an attractive force minus the force of gravity acting on magnet 2, or, layer 6 is saturated but not enough flux is present in layer 8 which when added to the force of gravity acting on magnet 2 is sufficient to offset the attractive force created by layer 6 so that the net force is one of attraction.

Figure 3:
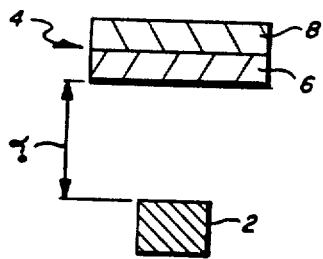
FIG. 3 is a schematic illustration in cross-section illustrating the balance of forces between a guide-way surface and a moving magnet positioned at a distance $a_o$ beneath the guide-way surface.

FIG. 3 illustrates the balance of forces obtained when magnet 2 is moving at a velocity $\bar{V}$ and at a distance $\alpha_o$ away from composite guide-way surface 4. Because of the balances of forces obtained, $\alpha_o$ may be considered the equilibrium distance for the system described. At this distance, the sum of the repulsive force created by flux leakage into layer 8 plus the force of gravity acting on magnet 2 is equal to the attractive force between magnet 2 and layer 6. Normally, the system will be designed such that $\alpha_o$ is less than the distance at which layer 6 becomes saturated.

Figure 4:
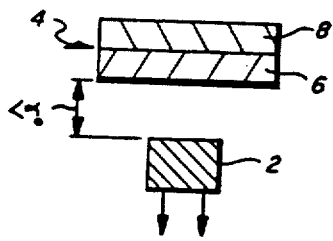
FIG. 4 is a schematic illustration in cross-section illustrating the establishment of a repulsive force between a guide-way surface and a moving magnet positioned at a distance $<a_o$ beneath the guide-way surface.

FIG. 4 illustrates a condition where the distance between magnet 2 and composite guide-way surface 4 is less than $\alpha_o$. Under these circumstances the sum of the repulsive force between layer 8 and magnet 2 plus the force of gravity acting on magnet 2 is greater than the attractive force between layer 6 and magnet 2. At distances less than $\alpha_o'$, layer 6 will always be saturated.

Though it is possible to construct a guide-way for suspending a moving body having a magnet attached thereto wherein the guide-way consists substantially only of a ferromagnetic material above the path of the magnet and intermediate the magnet and a nonferromagnetic conductor material, more desirable arrangements from the point of view of stability are described hereinbelow.

Figure 5:
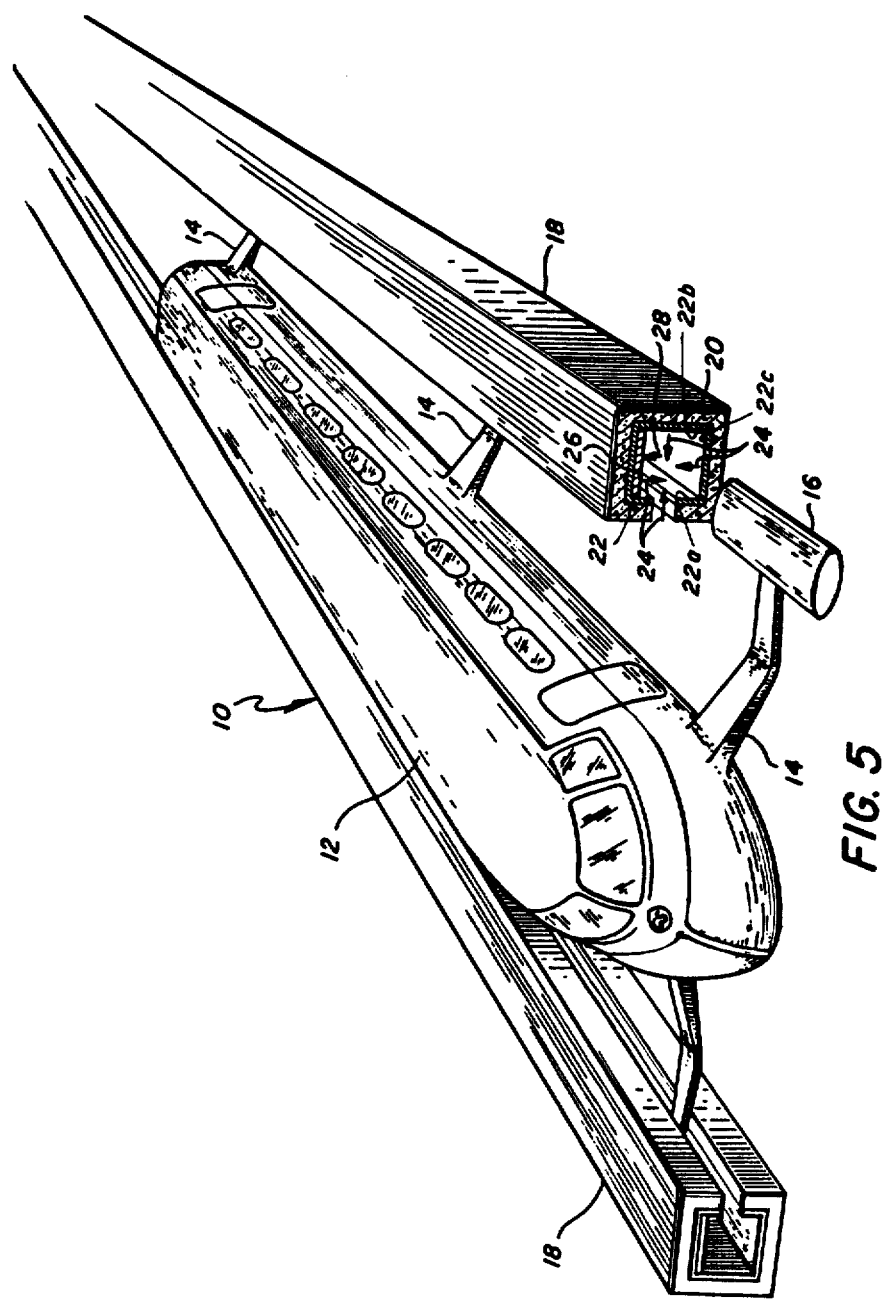
FIG. 5 is a perspective view partially cut-away showing a train-like vehicle including a suspension system according to the present invention.

Referring now to FIG. 5, 10 represents a land vehicle such as train car 12. Additional separate cars may be attached to car 12 to form a train. Car 12 has attached thereto strut members 14. These members are generally positioned so as to extend outwardly from the body portion of car 12. Normally a car such as 12 would have a total of about 4 of these strut members in the case of dual channel suspension or 2 or more in the case of mono-rail type suspension. Attached to members 14 are magnets 16. These magnets are preferably direct current superconducting electromagnets which fulfill the condition that $l/v$ is significantly less than $L/R$ where $l$ equals length of 16, L is the inductance of the path of the current and R is the effective resistance of the induced current. Direct current superconducting magnets are well known in the art. For example, one type consists of a wire or tape formed from a composite of superconductor material such as niobium-tin or niobium-titanium and a conductor such as copper. The insulated composite is cooled to superconducting temperatures with liquid helium and encased within a double walled dewar container. Magnet section 16 glides within a guide-way consisting of U-shaped channel members 18. This pair of members 18 is arranged in parallel so as to define a path along which the train 10 or other like vehicle can travel. Alternatively, train 10 may be suspended from a single channel in the manner of a mono-rail train. The train or vehicle may be propelled along its course by any conventional propulsion means such as a linear motor or a propeller. The design of channel member 18 is very important. Generally, member 18 will consist of an outer U-shaped support layer 20 formed of a conventional building material such as concrete. Within outer section 20 is another U-shaped channel 22 of a nonferromagnetic conductor material such as copper or aluminum. The moving magnet 16 will induce eddy currents in the nonferromagnetic conductor of channel 22. According to Lenz' law, induced currents will at every instant flow in a conductor such as the nonferromagnetic conductor of channel 22 in such a direction as to oppose any change in the applied magnetic flux. The force $\bar{F} = \bar{I} \times \bar{B}$, between the induced current $\bar{I}$ and the local field $\bar{B}$, will then become a force of repulsion represented by arrows 24. If $\bar{F}$ is to be large, the conductor 18 must be situated so that suitable eddy current paths are available. Such levitation is similar to the levitation of conductors in alternating magnetic fields.

An alternative viewpoint is to consider the conductor of channel 22 to be, in a high velocity limit, the boundary of a region of zero magnetic permeability. The magnetic flux from the magnet 16 is then compressed by the conductor of channel 22 and becomes further compressed if the magnet approaches the conductor. Thus the magnet experiences a restoring force away from the conductor. Power is of course dissipated in the conductor sheet and this results in a drag or eddy current brake on the movement of the coil of the magnet 16 and thus on any vehicle cooperating therewith.

The lift-to-drag ratio is greatly increased in the present suspension system through the use of a second layer of ferromagnetic material 26 such as iron adjacent the inside top surface, i.e., first layer, of the nonferromagnetic conductor of channel 22. Layer 26 causes an upwardly directed force, represented by arrow 28, to be applied to the moving magnet 16. Only negligible eddy current is induced in the ferromagnetic material because of its high resistivity. Drag may be further reduced by using alloys or laminations of ferromagnetic materials with thin layers of insulation between laminations.

In order to achieve a stable suspension, the ferromagnetic material 26 must become saturated as magnet 16 moves to within a predetermined distance thereof. Flux in excess of that required for saturation will penetrate the ferromagnetic material and cause eddy current repulsion of magnet 16 by the conductor of channel 22. If the first layer of nonferromagnetic conductor material of channel 22 were not placed above the second layer of ferromagnetic material 26 the suspension system would be unstable. Under those circumstances the net levitating force would be inversely related to the distance between magnet 16 and ferromagnetic material 26 which would result in magnet 16 attaching itself to the ferromagnetic material. The summation of attractive and repulsive forces derived from the combination of a ferromagnetic material and nonferromagnetic conductor is alone sufficient to suspend a magnetic source without the use of a conductor material below or in the sides of the channel. However, the use of nonferromagnetic conductor below, forming a third layer 22c, and in the sides 22a and 22b of the channel 22, forming fourth and fifth layers of nonferromagnetic conductor material, provides a more rigid suspension and one more resistant to oscillations. Normally, the amount of ferromagnetic material used will be such that it will become saturated as the magnet moves above mid-point in the channel so that equilibrium is achieved at mid-point. Any displacement of the magnet from the middle of the channel will result in restoring forces which tend to move the magnet back to an equilibrium position.

Figure 6:
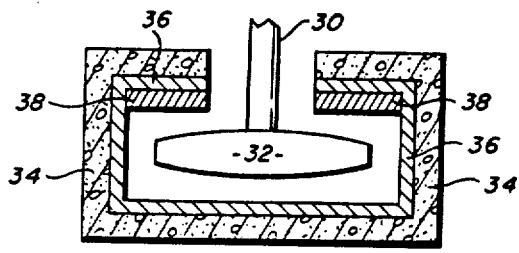
FIG. 6 is a schematic cross-sectional view of an alternative guide-way channel arrangement for use in the present invention.
Figure 7:
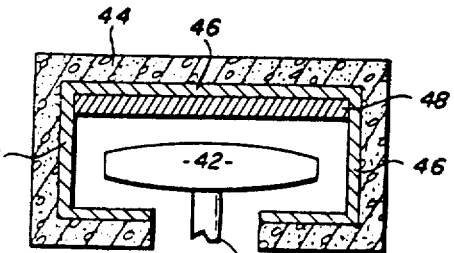
FIG. 7 is a schematic cross-sectional view of a second alternative guide-way channel arrangement for use in the present invention.

FIGS. 6 and 7 illustrate additional preferred guideway channel designs. In FIG. 6, support member 30 connecting magnet 32 to a train or similar vehicle (not shown) is substantially vertically disposed with magnet attached to the bottom portion thereof. In this configuration the U-shaped channel has its opening at the top. The general arrangement of elements in the channel is similar to that in FIG. 5, the outer section 34 comprising a structural material such as concrete, with complementary first inner layer of nonferromagnetic conductor 36. In addition, second layers of ferromagnetic material 38 are positioned against the upper portions of layer 36.

FIG. 7 illustrates a channel configuration having an inverted U-shape. In this arrangement, support member 40, with attached magnet 42, enters the channel from the bottom thereof. As in the above-described embodiments, the channel is formed by an outer structural channel 44, first nonferromagnetic channel layer 46 and a second ferromagnetic layer 48, with the latter being inside and adjacent to the upper portion of layer 46.

It will be apparent that still other arrangements are possible. For example, although the U-shape is the preferred channel configuration because of the stability which it provides, it is not necessary that the channel assume the U-shape. The important consideration is that lift be provided by a combination of eddy current repulsion between the magnet and a first nonferromagnetic conductor and attraction between the magnet and a second ferromagnetic conductor. The degree to which the separate layers participate in the lift force will change as velocity of the moving magnet changes. At low speeds a larger component of lift is provided by the ferromagnetic material.

Figure 9:
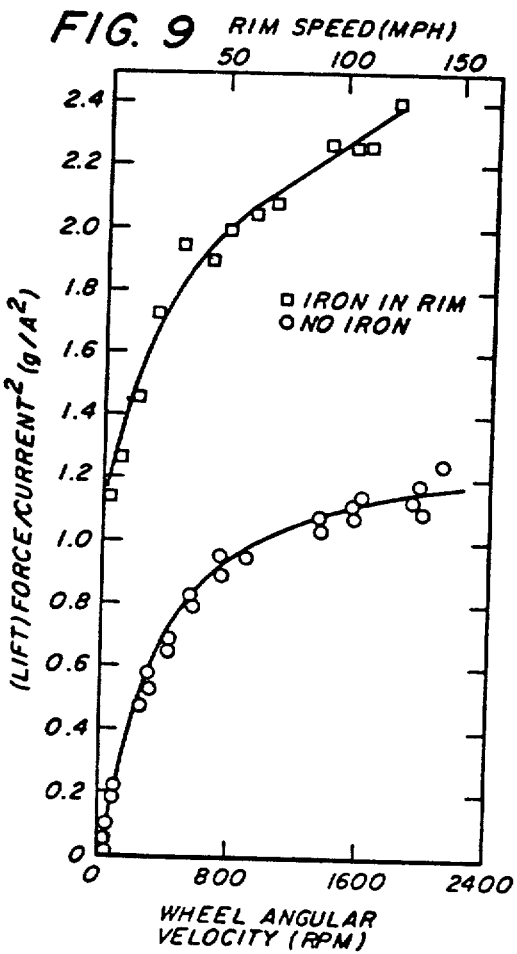
FIG. 9 is a graph illustrating the lift forces of the present invention as compared to a conventional eddy current repulsion system.
Figure 8:
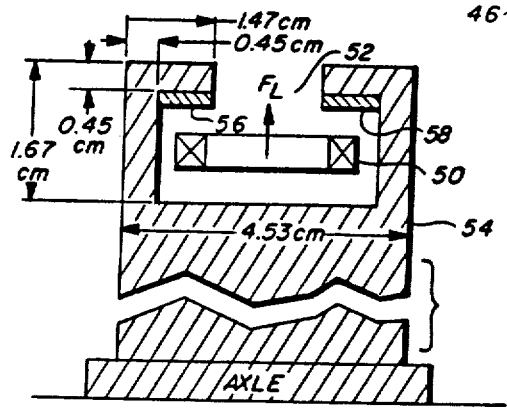
FIG. 8 is a schematic view in cross-section illustrating a test apparatus for determining representative lift forces and lift/drag ratio.
Figure 10:
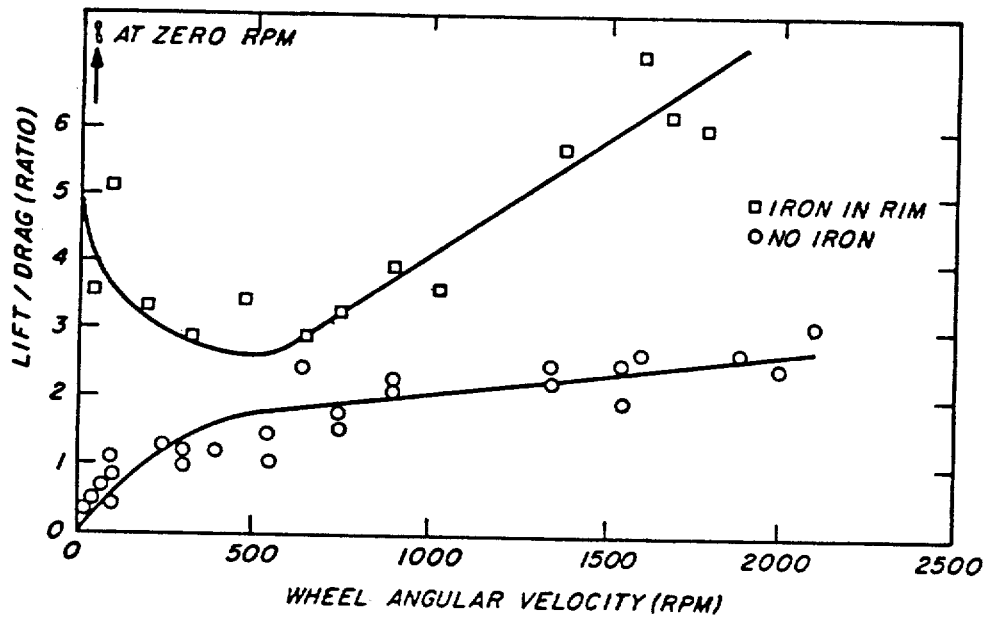
FIG. 10 is a graph illustrating the lift/drag ratios of the present invention as compared to the lift/drag forces obtained by a conventional eddy current repulsion system.

The present invention is illustrated by the following example:

A small direct current coil 50 was placed in a slot 52 cut in an aluminum wheel 54 as shown in FIG. 8. This slot was generally U-shaped and resembled the configuration shown in FIG. 2. Two strips of nickel-iron tape were positioned around the wheel at locations 56 and 58. Strain gages were used to measure the forces exerted on coil 50. The effect of air currents were eliminated by pulsing the magnet and measuring the change in force. The lift and drag forces were measured with and without the nickel-iron present and at various wheel speeds. The results of these tests are shown in FIGS. 9 and 10. From those figures, use of the ferromagnetic material (nickel-iron tape) is shown as increasing both the lift forces (FIG. 9) and the lift-to-drag ratio (FIG. 10) by a factor of about 2. The lift and lift/drag ratio measured in this experiment was limited by the constraints of the testing apparatus. Much higher lift/drag ratios are possible in full scale systems. Lift-to-drag ratios of about 17 to 30 are possible, using eddy current repulsion alone without the improvement of the present invention. Use of the present invention is expected under operating conditions to increase these ratios by a factor of 3 or 4. An increase of this magnitude represents a significant improvement in the art of magnetic suspension systems and fulfills a long felt need in the art for a practical suspension system designed to support high speed land vehicles.

Though the invention has now been described with reference to preferred embodiments and specific examples, it will be appreciated by those of ordinary skill in the art that many modifications and adaptations of the invention are possible without departure from the spirit and scope of the invention as set out in the claims hereinbelow.

I claim:

1. An improved composite guide-way for providing lift forces to bodies, which bodies have attached thereto at least one magnet which is adapted to move in a predetermined path along the course of said guide-way comprising:
   a. a first layer containing nonferromagnetic conductor material, said layer being disposed above said predetermined path;
   b. a second layer containing ferromagnetic material, said layer being positioned intermediate said first layer and said predetermined path, and
   c. supporting means to rigidly support said first and second layers, said supporting means being so arranged as to allow maximum flow of magnetically induced current in said first layer.

2. The improved guide-way of claim 1 further including a third layer containing nonferromagnetic conductor material, said third layer being disposed beneath said predetermined path, and means to rigidly support said third layer.

3. The improved guide-way of claim 1 further including fourth and fifth layers of nonferromagnetic conductor material vertically disposed and positioned at the respective sides of and along said predetermined path and extending at least a portion of the distance between said first and third layers.

4. The improved guide-way of claim 1 wherein the layer material on a selected surface of said guide-means has a slot therein extending the length of said guide-means.

5. The improved guide-way of claim 1 wherein said second layer comprises laminations of ferromagnetic materials with thin layers of insulation between laminations.

* * * * *

UNITED STATES PATENT AND TRADEMARK OFFICE
CERTIFICATE OF CORRECTION

PATENT NO. : 3,892,185

DATED : July 1, 1975

INVENTOR(S) : Charles A. Guderjahn

It is certified that error appears in the above-identified patent and that said Letters Patent is hereby corrected as shown below:

In Claim 3, col. 8, line 3,
"claim 1" should read --claim 2--.

In Claim 4, col. 8, line 9,
"claim 1" should read --claim 2--.

Signed and Sealed this

Seventeenth Day of July 1984

[SEAL]

Attest:

GERALD J. MOSSINGHOFF

Attesting Officer

Commissioner of Patents and Trademarks